(12) United States Patent
Pichot et al.

(10) Patent No.: US 9,641,874 B2
(45) Date of Patent: May 2, 2017

(54) SYSTEM FOR BROADCASTING VIDEO PROGRAMMES

(75) Inventors: Bernard Pichot, Cesson Sevigne (FR);
Laurent Roul, Cesson Sevigne (FR);
Ludovic Poulain, Cesson Sevigne (FR);
Matthieu Puton, Cesson Sevigne (FR)

(73) Assignee: Enensys Technologies, Cesson Sevigne (FR)

(*) Notice: Subject to any disclaimer, the term of this patent is extended or adjusted under 35 U.S.C. 154(b) by 0 days.

(21) Appl. No.: 14/233,458

(22) PCT Filed: Jul. 11, 2012

(86) PCT No.: PCT/EP2012/063569
§ 371 (c)(1),
(2), (4) Date: Apr. 16, 2014

(87) PCT Pub. No.: WO2013/010872
PCT Pub. Date: Jan. 24, 2013

(65) Prior Publication Data
US 2014/0298397 A1    Oct. 2, 2014

(30) Foreign Application Priority Data

Jul. 20, 2011 (FR) ..................................... 11 56572

(51) Int. Cl.
*H04N 7/173* (2011.01)
*H04N 21/236* (2011.01)
(Continued)

(52) U.S. Cl.
CPC ... *H04N 21/23614* (2013.01); *H04N 21/2221* (2013.01); *H04N 21/2381* (2013.01); *H04N 21/242* (2013.01); *H04N 21/64707* (2013.01)

(58) Field of Classification Search
CPC ........................... H04N 21/235; H04N 21/435
(Continued)

(56) References Cited

U.S. PATENT DOCUMENTS 8,432,882 B2 * 4/2013 Crookes et al. ............... 370/342
2008/0170531 A1 * 7/2008 Petry et al. .................... 370/312

OTHER PUBLICATIONS

Thomson: Netprocessor 9026; Sep. 2, 2010; pp. 1-2, XP002686329; retrieved from Internet: URL:http://www.thomson-networks.com/sites/default/files/Products/CDT-3042D-3.pdf.
(Continued)

*Primary Examiner* — Jivka Rabovianski
(74) *Attorney, Agent, or Firm* — Bachman & LaPointe, P.C.

(57) ABSTRACT

The present invention concerns a method for generating a stream in accordance with the DVB standard that is understood by a first-generation decoder, typically in accordance with DVB-S/C/T/, and which also enables the deterministic generation of a stream in accordance with the second-generation DVB-T2 standard. A method is described for generating a stream containing a multiplex according to a first-generation DVB standard. This stream also contains the information relating to an encapsulation in accordance with DVB-T2 of at least one subset of broadcast programs inserted in the stream in the form of private sections that will be ignored by a first-generation decoder that will decode the stream in accordance with the first-generation standard. Equipment according to the invention can construct the T2-MI stream at a DVB-T2 transmitter deterministically, which can then be integrated in an SFN network.

7 Claims, 4 Drawing Sheets

(51) Int. Cl.
*H04N 21/222* (2011.01)
*H04N 21/2381* (2011.01)
*H04N 21/242* (2011.01)
*H04N 21/647* (2011.01)

(58) Field of Classification Search
USPC .................................... 725/33, 62, 105, 116
See application file for complete search history.

(56) References Cited

OTHER PUBLICATIONS

Thomson: Netprocessor 9026 Demux; Mar. 13, 2009, pp. 1-2, XP002686330; retrieved from Internet: URL: http://www.tbcintegration.com/pdf/CDT-3096D.pdf.

Digital Video Broadcasting (DVD); Modulator Interface (T2-MI) for a second generation digital terrestrial television broadcasting system (DVB-T2), Technical Specification, European Telecommunication s Standards Institute (ETSI), 650, Route Des Lucioles; F-06921 Sophia-Antipolis; France, vol. Broadcas, No. vol. 2.1, Dec. 1, 2010, XP014061858.

Irini S. Reljin et al.; DVB Standards Development; Telecommunication in Modern Satellite, Cable, and Broadcasting Services, 2009. Telsiks International Conference on, IEEE, Piscataway, NJ, USA, Oct. 7, 2009, pp. 263-272, XP031573513, ISBN: 978-1-4244-4382-6.

* cited by examiner

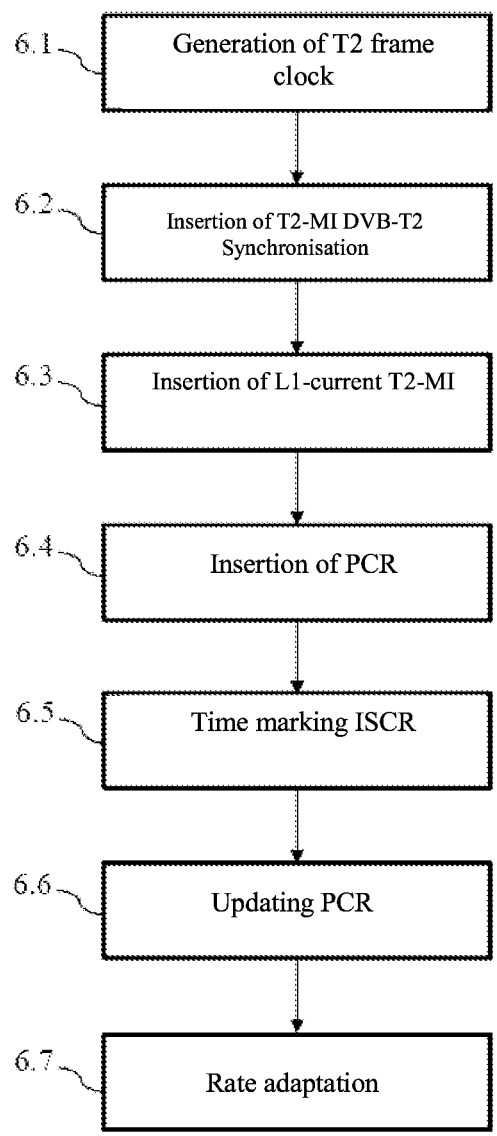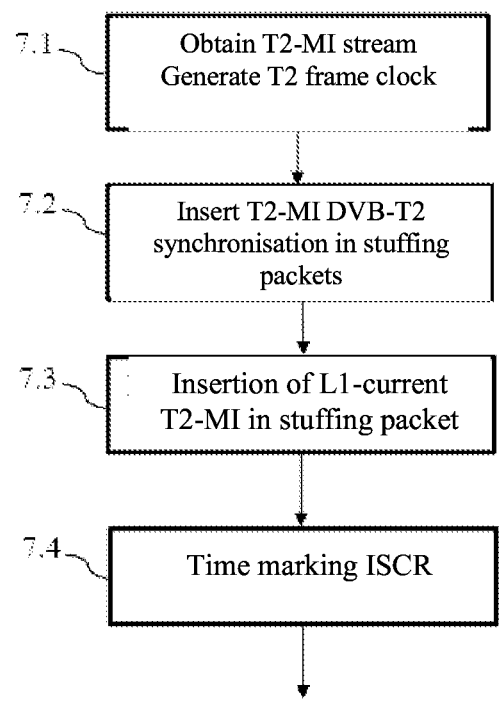
Fig. 7
Fig. 6

SYSTEM FOR BROADCASTING VIDEO PROGRAMMES

BACKGROUND

The present invention concerns the field of broadcasting digital television programmes and more particularly a method for generating a stream in accordance with the DVB (Digital Video Broadcast) standard that can be decoded by a first-generation decoder, typically in accordance with DVB-S/C/T/, and which also enables the deterministic generation of a stream in accordance with the second-generation DVB-T2 standard.

Historically, the ETSI (European Telecommunications Standards Institute) proposed a first standard, DVB-S, for the broadcasting of programmes by satellite. This standard was developed as the DVB-C standards for broadcasting by cable network and DVB-T for terrestrial broadcasting. These standards will be referred to as first-generation DVB standards.

These standards share a common platform. The programmes are composed of multiplexed audio and video streams to which there is added signalling information in the form of signalling tables known by the term SI/PSI (Service Information/Programme Specific Information) tables. The resulting multiplexed stream is encapsulated in a transport layer in accordance with the standard MPEG-2 TS (Transport Stream) for broadcasting. These standards have experienced clear success and constitute a widespread television broadcasting technology.

At the present time, a new generation of these standards is being developed. In particular, terrestrial broadcasting is standardised in the form of a DVB-T2 standard. This new standard makes it possible to aggregate, in a same stream, several physical layer tunnels referred to as PLPs (Physical Layer Pipes). Each of these physical layer tunnels consists of a multiplex of programs in a transport stream of the MPEG-2 TS (Moving Picture Experts Group 2 Transport Stream) type having its own modulation parameters. These tunnels are collected together in a stream referred to as a T2-MI (Modulator Interface) stream. The T2-MI stream is itself encapsulated in a new layer of the MPTS (Multiple Programme Transport Stream) type. The T2-MI stream comprises T2-MI data packets such as T2-MI timestamp synchronisation packets, signalling packets including the packet called L1-current which gives information on the structure of the T2-MI stream and packets called baseband frames containing the data of the MPEG-2 TS streams of the different various tunnels. The T2-MI packets are organised in a T2-MI frame, each frame contains a T2-MI timestamp packet, an L1-current T2-MI packet and baseband frame packets.

The T2-MI streams are finely synchronised by means of T2-MI timestamp packets so as to enable broadcasting in an SFN (Single Frequency Network) area. These areas consist of a plurality of transmitters broadcasting the same DVB-T2 radio signal on the same frequency. This broadcasting mode is possible only if the transmitters are finely synchronised and the DVB-T2 radio signals transmitted are identical to within a bit, otherwise interference will be generated in the zones covered by the transmissions of at least two transmitters.

The second-generation terrestrial broadcasting standard cannot be adopted by switching and must cohabit with a broadcasting in parallel with the same programmes according to the first-generation standards. If the example is taken of an operator broadcasting a cluster of programmes by satellite according to the DVB-S standard and wishing also to adopt terrestrial broadcasting of the same programmes according to the DVB-T2 standard, it is necessary at the present time to broadcast at least two streams, a first conventional MPEG-2 TS multiplex containing the programmes intended for households provided with a conventional satellite decoder according to the DVB-S standard and a second multiplex comprising T2-MI packets encapsulated in a layer of the MPEG-2 TS type intended for various DVB-T2 transmitters. This gives a duplication of the programmes whereas satellite bandwidth is expensive. These additional costs are a restriction on the development of the DVB-T2 standard second generation.

SUMMARY

The invention aims to solve the aforementioned problems by a method for generating a stream containing a multiplex in accordance with a first-generation DVB standard. This stream also contains synchronisation packets and signalling packets in accordance with the DVB-T2 standard. The synchronisation packets and the signalling packets according to the DVB-T2 standard are included in parts, referred to as private sections, inserted in the stream containing a multiplex in accordance with the first-generation DVB standard, not decoded or not processed, by a decoder in accordance with the first-generation DVD standard. The private sections are included in packets that are added in the stream containing the multiplex in accordance with the first-generation DVB standard or are included in packets having a programme identifier not referenced in a programme association table accessible to the decoder in accordance with the first-generation DVD standard.

Equipment according to the invention will on the other hand be able to construct the T2-MI stream at a DVB-T2 transmitter that contains at least one subset of the broadcast programmes. This construction of the T2-MI stream is done according to the invention in a deterministic and synchronous manner that enables SFN terrestrial broadcasting of the streams thus constructed at each DVB-T2 transmitter. Likewise, the invention makes it possible to proceed with stream regionalisation. A person skilled in the art will understand that this invention also applies in the context of an MFM (Multiple Frequency Network) broadcasting.

The invention concerns a method for generating a stream referred to as a derived stream, from a stream referred to as the original stream, said original stream being a transport stream comprising a programme multiplex in accordance with a first-generation DVB standard decodable by a decoder according to the DVB standard, characterised in that the method comprises the following steps of:
  obtaining a T2-MI stream according to a second-generation standard comprising the programme multiplex and at least synchronisation packets and signalling packets in accordance with the second-generation standard,
  generating the derived stream by inserting in the original stream information representative of the synchronisation packets and the signalling packets, the information being inserted in parts of the derived stream not decoded by the decoder in accordance with the first-generation DVB standard.

The invention also concerns a device for generating a stream referred to as the derived stream, from a stream referred to as the original stream, said original stream being a transport stream comprising a programme multiplex in accordance with a first-generation DVB standard decodable by a decoder according to the DVB standard, characterised in that the device comprises:

means for obtaining a T2-MI stream in accordance with a second-generation standard comprising the programme multiplex and at least synchronisation packets and signalling packets in accordance with the second-generation standard, generation of the derived stream by inserting in the original stream information representative of the synchronisation packets and signalling packets, the information being inserted in parts of the derived stream not decoded by the decoder according to the first-generation DVB standard.

Thus it is not necessary to broadcast at least two streams, a first conventional MPEG-2 TS multiplex containing the programmes intended for households provided with a conventional satellite decoder according to the first-generation DVB-S standard and a second multiplex comprising T2-MI packets encapsulated in a layer of the MPEG-2 TS type intended for the various DVB-T2 transmitters. The satellite bandwidth is thus saved.

According to a particular embodiment of the invention, the inserted information is inserted by adding packets at a given position in the original stream and in that the method further comprises the steps of:

inserting time stamp values included in the original stream in the parts of the derived stream not decoded by the decoder according to the first-generation DVB standard, the time stamps being inserted in packets added to the original stream, updating values of the time stamps in the derived stream so as to take into account the addition of the packets.

Thus all the information necessary for a reconstruction of a stream according to the second-generation standard is included in the derived stream.

According to a particular embodiment of the invention, the rate is adapted by inserting stuffing packets, the programme identifier of which is different from the null programme.

According to a particular embodiment of the invention, the information inserted is inserted in packets having a programme identifier not referenced in a programme association table accessible to the decoder according to the first-generation DVB standard and the packets having a non-referenced programme identifier replacing stuffing packets included in the original stream.

Thus all the information necessary for a reconstruction of a stream according to the second-generation standard are included in the derived stream. By replacing stuffing packets of the original stream with packets having a programme identifier not referenced in a programme association table accessible to the decoder according to the first-generation DVB standard, the decoder according to the first-generation DVB standard is not disturbed by the information necessary for a reconstruction of a stream according to the second-generation standard.

In addition, the number of packets included in the derived stream being identical to the number of packets included in the original stream, it is not necessary to modify the time marking of the original stream.

According to a particular embodiment of the invention, each packet having a non-referenced programme identifier further comprises information identifying the position of a packet in the original stream included in the derived stream.

Thus the present invention is suited to systems in which the position of the synchronisation information in a stream is important. Since stuffing packets do not in general have a predefined position in a stream, it is possible to indicate the position in the stream at which the synchronisation information should be situated.

According to a particular embodiment of the invention, the programme identifier not referenced in the programme association table accessible to the decoder according to the first-generation DVB standard is different from the 1FFF value in hexadecimal.

The invention also concerns a method for generating a stream according to a second-generation DVB standard from a so-called derived stream, comprising a programme multiplex according to a first-generation DVB standard decodable by a decoder according to the DVB standard and information representative of at least synchronisation packets and signalling packets according to the second-generation standard, characterised in that the method comprises the steps of:

extracting the information representative of at least synchronisation packets and signalling packets according to the second-generation standard included in the derived stream, generating the stream according to the second-generation DVB standard from the derived stream, and information representative of at least synchronisation packets and signalling packets according to the second-generation standard.

The invention also concerns a device for generating a stream according to a second-generation DVB standard from a so-called derived stream, comprising a programme multiplex according to a first-generation DVB standard decodable by a decoder according to the DVB standard and information representative of at least synchronisation packets and signalling packets according to the second-generation standard, characterised in that the method comprises the steps of:

means for extracting the information representative of at least synchronisation packets and signalling packets according to the second-generation standard included in the derived stream, means for generating the stream according to the second-generation DVB standard from the derived stream, and information representative of at least synchronisation packets and signalling packets according to the second-generation standard.

Thus it is no longer necessary to transfer, by means of a satellite, a second multiplex comprising T2-MI packets encapsulated in a layer of the MPEG-2 TS type intended for various DVB-T2 transmitters. It is possible to generate the stream in accordance with a second-generation DVB standard from a derived stream.

According to a particular embodiment of the invention, the method further comprises the steps of:

reading of time marker values included in parts of the derived stream not decoded by the decoder according to the first-generation DVB standard, updating of time marker values included in parts of the derived stream decodable by the decoder according to the first-generation DVB standard with the values read, and the stream according to a second-generation DVB standard is generated from the derived stream, the marker values of which have been updated.

According to a particular embodiment of the invention, the parts of the original stream not decoded by the decoder according to the first-generation DVB standard are packets having a programme identifier not referenced in a programme association table accessible to the decoder according to the first-generation DVB standard.

According to a particular embodiment of the invention, at least one packet having a non-referenced programme identifier further comprises information identifying the position of a packet included in the derived stream.

Thus the present invention is suited to systems in which the position of the synchronisation information in a stream is important. Since stuffing packets do not in general have a predefined position in a stream, it is possible to indicate the position in the stream at which the synchronisation information should be situated.

BRIEF DESCRIPTION OF THE DRAWINGS

The features of the invention mentioned above, as well as others, will emerge more clearly from a reading of the following description of an example embodiment, said description being given in relation to the accompanying drawings, among which:

FIG. 6 illustrates the method for generating the derived stream according to a first example embodiment of the present invention;

FIG. 7 illustrates the method for generating the derived stream according to a second example embodiment of the present invention;

DETAILED DESCRIPTION

The invention is described more precisely in the context of an example embodiment based on the first-generation DVB-S broadcasting standard, but a person skilled in the art will understand that it can apply to any first-generation DVB standard including, for example, DVB-C, DVB-T or other. This is because these first-generation standards are similar and use an identical stream format.

Figure 1:
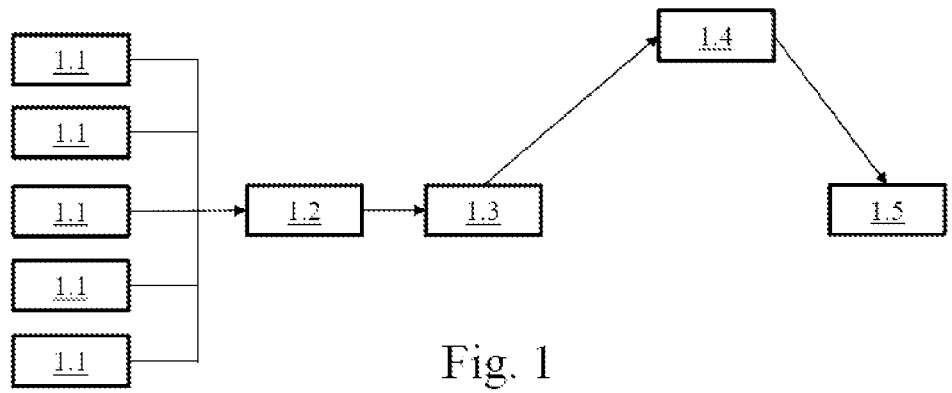
FIG. 1 illustrates the architecture of a satellite broadcasting system according to the DVB-S standard.

FIG. 1 illustrates the architecture of a satellite broadcasting system according to the DVB-S or DVB-S2 standard. Upstream, a set of audio-video encoders 1.1 compresses the programmes. These programmes are then multiplexed by a multiplexer 1.2 that generates a multiplex to the MPEG-2 MPTS (Multi-Programme Transport Stream) format. This multiplex is then sent to a DVB-S or DVB-S2 modulator 1.3. The signal thus modulated is sent in the direction of a satellite 1.4 that broadcasts it to a DVB-S/S2 demodulator 1.5 at the home of the user.

Figure 2:
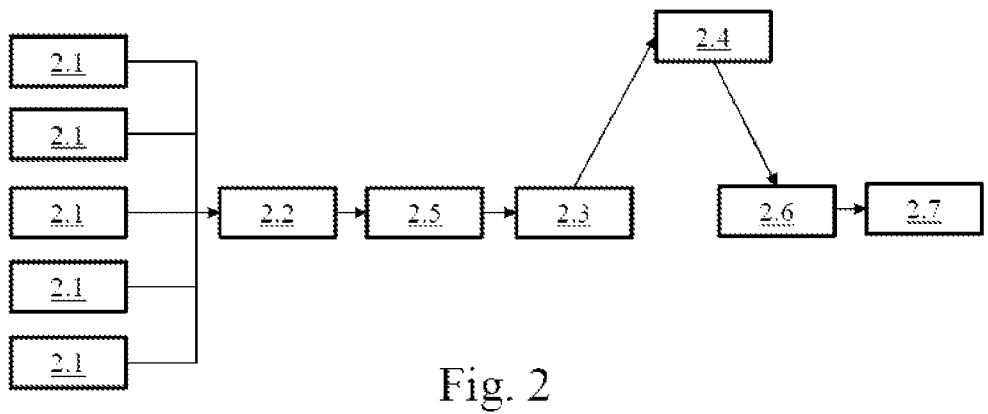
FIG. 2 illustrates the architecture of a terrestrial broadcasting system according to the DVB-T2 standard.

FIG. 2 illustrates the architecture of a terrestrial broadcasting system according to the DVB-T2 standard. Some elements of the previous architecture are found again. In particular, the plurality of encoders 2.1, the multiplexer 2.2 and a DVB-S/S2 modulator 2.3 for sending the signal to the satellite 2.4 are found again. On the other hand, the format of the stream sent is different. This is because the multiplex constructed by the multiplexer 2.2 is sent to a T2 gateway 2.5 responsible for encapsulating the multiplex in a T2-MI stream itself encapsulated in an MPTS stream. This mechanism is described in the document "Digital Video Broadcasting (DVB); Modulator Interface (T2-MI) for a second generation digital terrestrial television broadcasting system (DVB-T2)" referenced "DVB Document A136r2". The T2-MI stream encapsulated in an MPTS stream is sent to the satellite and broadcast to the DVB-T2 transmitters. These transmitters comprise a DVB-T2 modulator 2.6 for terrestrial transmission by the transmitter 2.7.

The T2-MI stream encapsulated in an MPTS stream is broadcast by the satellite to a set of transmitters 2.7 for transmission over one or more regions and all the modulators in the same region or more precisely the same SFN area transmits the modulated signal at the same frequency. It is therefore essential that the various modulators 2.6 of each transmitter 2.7 in the same region be finely synchronised so that the SFN transmission by the various transmitters 2.7 takes place without any problem. To this end, the T2-MI stream has specific information and particularly special synchronisation information, typically the T2-MI packet called DVB-T2 timestamp, which implements a time marking enabling this fine synchronisation of the DVB-T2 modulators. This synchronisation is based on the fact that time labels, the DVB-T2 timestamp packets, are generated at a single point in the T2 gateway 2.5 upstream of the broadcast.

An operator broadcasting a cluster of programmes according to the first-generation DVB-S/S2 standard and wishing to adopt a DVB-T2 broadcast mode is forced to duplicate the transmission of his programmes to the satellite. A first transmission is made from a DVB-S stream intended for users. A second transmission is done to the MPTS encapsulated T2-MI format intended for DVB-T2 modulators. These two streams are incompatible. This is because a T2-MI stream cannot be decoded by the DVB-S/S2 decoders deployed in the homes of users. Conversely, the DVB-S/S2 stream cannot be used by DVB-T2 modulators.

A first idea of a solution would be to deploy a T2 gateway such as the gateway 2.5 upstream of the DVB-T2 modulators 2.6. The DVB-S stream broadcast by the satellite for users would then be received and the T2 gateway would be used for encapsulating this stream to the T2-MI format required by DVB-T2 modulators. This solution is not functional since the process of generating the T2-MI stream from a conventional TS stream is not deterministic. The streams generated are not identical to within a bit and cannot be synchronised finely.

The invention is based on the generation of the T2-MI stream upstream of the broadcasting to the DVB-T2 transmitters. Once the T2-MI stream is generated, the specific T2-MI packets such as the DVB-T2 timestamp time marking packets and the L1-current signalling packets are inserted in the conventional MPTS stream. It is also necessary to insert a time marking in accordance with the ISCR (Input Stream Clock Reference) mechanism of the packets. The ISCR field transports the values of a 22-bit counter timed at the modulation frequency, which a DVB T2 receiver can use for regenerating the exact rate of the stream received. The ISCR field is one of the ISSY (Input Stream SYnchronisation) fields. The parameters included in the ISSY fields are used for generating the T2-MI stream with several tunnels and when the deletion of null packets is activated. The fields making up the ISSY and in particular the ISCR are inserted in the header of the baseband frames. More precisely, the time of arrival of all the packets in the equipment generating the T2-MI stream is marked by this counter, and the ISCR field is the time of arrival of the first complete TS packet in the baseband frame.

According to the first example embodiment of the present invention, parts, referred to as private sections, not decoded by the decoder according to the first-generation DVB standard, are inserted in the original MPTS stream. The private sections comprise information representative of T2-MI packets such as the DVB-T2 timestamp synchronisation packets and the L1-current signalling packets. New packets comprising the private sections are added to the original MPTS stream.

The new packets inserted in the original MPTS stream have the effect of modifying the rate thereof. Consequently, the time marking of the various programmes or PCR (Programme Clock Reference) mechanism is no longer valid. This mechanism consists of regularly introducing a time label in the packets of the programme to enable the broadcasting thereof to be synchronised. According to the first example embodiment of the present invention, a last processing operation is therefore necessary.

The values of the PCR time markers are recovered in the original MPTS stream and are inserted in private sections within the meaning of the MPTS format. The values of the original PCR time markers are updated in the packets in order to adapt to the new rate of the stream. Because of this, the resulting stream, referred to as the derived stream, can be broadcast directly to DVB-S/S2 users. This is because the DVB-S/S2 decoders ignore such private sections and are able to decode the resulting stream as if it were a conventional MPTS stream.

According to the second example embodiment of the present invention, parts, referred to as private sections, not decoded by the decoder according to the first-generation DVB standard, are inserted in the original MPTS stream. The private sections comprise information representative of T2-MI packets such as the DVB-T2 timestamp synchronisation packets and the L1-current signalling packets. The packets comprising private sections replace stuffing packets included in the original MPTS stream.

The stuffing packets are also called null programme packets. They have for example an identifier equal to 1FFF.

The various operations performed according to the first example embodiment on the PCR time markers no longer need to be performed, the rate of the MPTS stream not being modified in the second example embodiment of the present invention.

The resulting stream, referred to as the derived stream, can be broadcast directly to DVB-S/S2 decoders, which ignore the packets having a programme identifier not referenced in the programme association table.

The derived stream is received by each DVB-T2 transmitter and enables dedicated equipment to generate an MPTS encapsulated T2-MI stream. This generation process is deterministic and, the synchronisation time information being that generated upstream of the broadcasting, it is identical at all the DVB-T2 transmitters and it is possible to broadcast the streams thus reconstructed at each DVB-T2 transmitter according to an SFN transmission scheme.

Original stream means the MPTS encapsulated multiplex stream that is generated by the multiplexer 3.2. Derived stream means the stream generated by the DTH T2 gateway according to the invention that is derived from the original MPTS stream by insertion of information representative of synchronisation packets and signalling packets in parts of the original stream not decoded by the decoder according to the first-generation DVB standard.

The derived stream has the same format as the original stream, but also comprises private sections containing information representative of synchronisation packets and signalling packets.

The original and derived streams are therefore in accordance with the same first-generation DVB standard.

Figure 3:
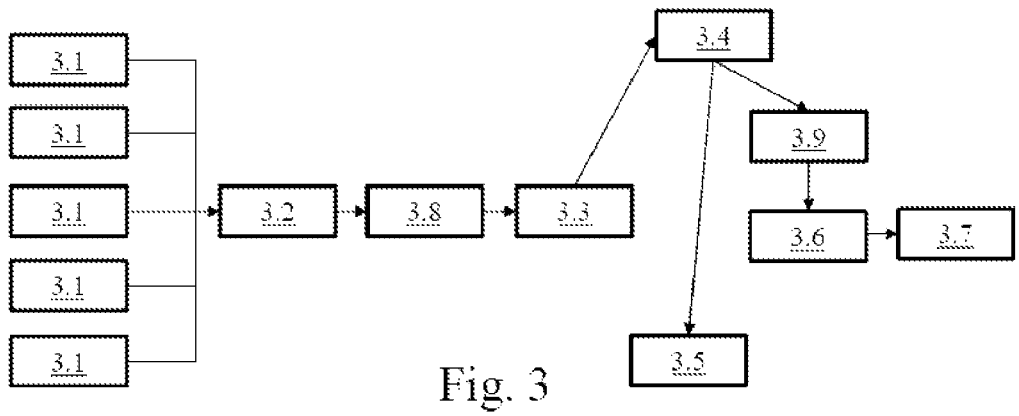
FIG. 3 illustrates the architecture of an example embodiment of a broadcasting system according to the invention.

FIG. 3 illustrates the architecture of an example embodiment of a broadcasting system according to the invention. The elements common to the architectures already described are found again, the set of encoders 3.1 and the multiplexer 3.2 for generating the so-called original MPTS multiplex stream at the output of the multiplexer 3.2. The original MPTS stream is then processed by a modified T2 gateway 3.8 according to the present invention, which is referred to as a DTH (Direct To Home) T2 gateway. It is this DTH T2 gateway that is responsible for generating the MPTS stream in which the T2-MI information according to the invention is inserted. This generation is detailed below. The derived MPTS stream is then sent by a DVB-S/S2 modulator to the satellite 3.4 for broadcasting. This broadcasting is done first to users having conventional satellite reception 3.5, a decoder according to the first-generation DVB standard. These users have a conventional satellite decoder that can decode the stream received and do not access the synchronisation packets and the signalling packets.

The broadcast cluster is therefore received by the satellite users having a decoder according to the first-generation DVB standard transparently as if it were a conventional MPTS stream according to the architecture of FIG. 1.

The same derived MPTS stream is also broadcast to equipment 3.9 according to the invention referred to as DTH T2 edge generators. Each DTH T2 generator generates a stream according to a second-generation DVB standard from the derived stream received, which is transferred to a conventional DVB-T2 modulator 3.6. The output of the DVB-T2 modulator is connected to a DVB-2 transmitter 3.7.

The invention enables to use the same stream for a conventional decoding by users and a DVB-T2 transmission is situated firstly in the DTH T2 gateway 3.8 that makes it possible to generate the derived stream according to the invention and in the DTH T2 generator 3.9 that makes it possible to construct the T2-MI stream from the derived stream. The invention would function in the same way if the satellite broadcasting were replaced by a cable, terrestrial or IP (Internet Protocol). It enables that a same stream may be used by a first generation DVB broadcasting and by a DVB-T2 broadcasting.

Figure 4:
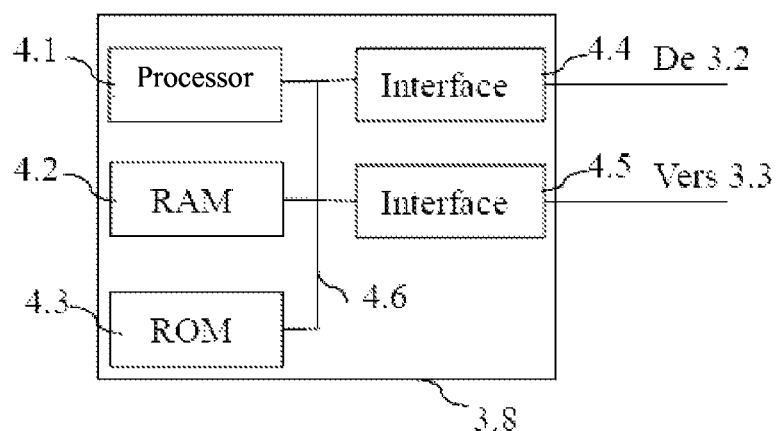
FIG. 4 shows a device for generating a derived stream.

FIG. 4 shows a device for generating a derived stream.

The device for generating a derived stream or DTH T2 gateway 3.8 comprises a communication bus 4.6 to which there are connected a processor 4.1, a non-volatile memory 4.3, a random access memory 4.2, an interface 4.4 for communicating with the multiplexer 3.2 and an interface for communicating with the modulator 3.3.

The non-volatile memory 4.3 stores the software modules implementing the invention, as well as the data for implementing the algorithms that will be described below with reference to FIGS. 6 and/or 7.

More generally, the programs according to the present invention are stored in a storage means. This storage means can be read by the microprocessor 4.1.

When the DTH T2 gateway 3.8 is powered up, the software modules according to the present invention are transferred into the random access memory 4.2, which then contains the executable code of the invention as well as the data necessary for implementing the invention.

By means of the interface 4.4, the DTH T2 gateway 3.8 receives the original stream from the multiplexer 3.2.

By means of the interface 4.5, the DTH T2 gateway 3.8 transfers the derived stream to the modulator 3.8.

All or some of the steps of the algorithms described hereinafter with regard to FIGS. 6 and/or 7 can be implemented by software by executing the steps by means of a programmable device such as a microprocessor, a DSP (Digital Signal Processor), or a microcontroller, or implemented in a component such as an FPGA (Field-Programmable Gate Array) or an ASIC (Application-Specific Integrated Circuit).

In other words, the DTH T2 gateway 3.8 comprises circuitry that enables the DTH T2 gateway 3.8 to execute the steps of the algorithm of FIGS. 6 and/or 7.

Figure 5:
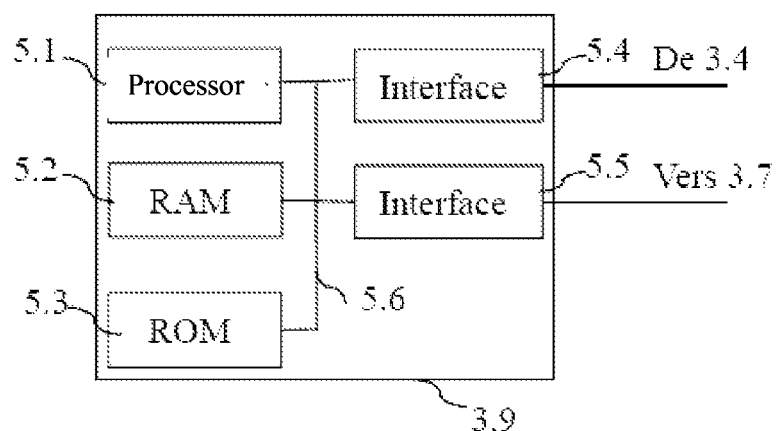
FIG. 5 shows a device for generating a stream according to a second-generation DVB standard from a so-called derived stream.

FIG. 5 shows a device for generating a stream according to a second-generation DVB standard from a so-called derived stream.

The device for generating a stream according to a second-generation DVB standard or DTH T2 generator 3.9 comprises a communication but 5.6 to which there are connected a processor 5.1, a non-volatile memory 5.3, a random access memory 5.2, an interface for receiving satellite signals 5.4 and an interface for communication with the modulator 3.6.

The non-volatile memory 5.3 stores the software modules implementing the invention, as well as the data for implementing algorithms that will be described hereinafter with reference to FIGS. 8 and/or 9.

More generally, the programs according to the present invention are stored in a storage means. This storage means can be read by the microprocess 5.1.

When the DTH T2 generator 3.9 is powered up, the software modules according to the present invention are transferred into the random access memory 5.2, which then contains the executable code of the invention as well as the data necessary for implementing the invention.

By means of the interface 5.4, the DTH T2 generator 3.9 receives the derived stream, modulated and broadcast by the satellite 3.4.

By means of the interface 5.5, the DTH T2 generator 3.9 transfers the stream according to a second-generation DVB standard to the modulator 3.6.

All or some of the steps of the algorithms described hereinafter with regard to FIGS. 8 and/or 9 can be implemented by software by executing the steps by means of a programmable device such as a microprocessor, a DSP (Digital Signal Processor), or a microcontroller, or implemented in a component such as an FPGA (Field-Programmable Gate Array) or an ASIC (Application-Specific Integrated Circuit).

Figure 8:
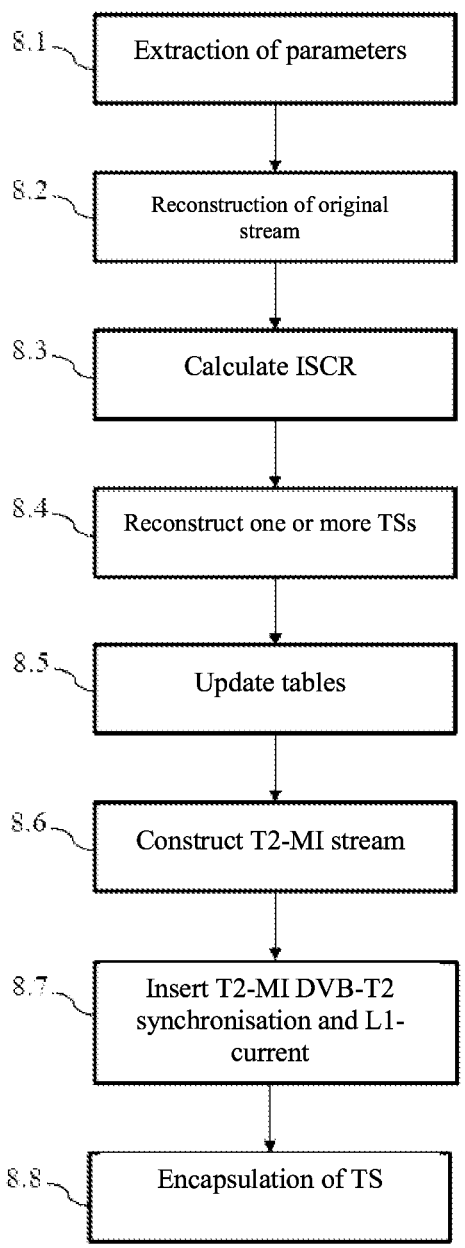
FIG. 8 illustrates the method for generating a stream according to a second-generation DVB standard from the derived stream according to the first example embodiment of the present invention.

In other words, the DTH T2 gateway 3.8 comprises circuitry that enables the DTH T2 generator 3.9 to execute the steps of the algorithms of FIGS. 8 and/or 9.

FIG. 6 illustrates the method for generating the derived stream according to a first example embodiment of the present invention.

This method is implemented by the DTH T2 gateway 3.8. Some steps of the method are identical to the steps performed by a conventional T2 gateway such as the T2 gateway 2.5 in FIG. 2. This equipment is situated at the network head. It receives an original MPTS stream coming from the multiplexer 3.2. The DTH T2 gateway 3.8 obtains a T2-MI stream according to a second-generation standard comprising the programme multiplex included in the original MPTS stream and inserts in the original MPTS stream at least synchronisation packets and signalling packets according to the second-generation standard.

The DTH T2 gateway 3.8 generates a derived stream by inserting in the original stream the synchronisation packets and the signalling packets in parts of the original stream not decoded by the decoder according to the first-generation DVB standard.

This insertion is transparent for a standard decoder in accordance with the first-generation DVB standard. This T2-MI stream may contain several physical-layer tunnels as required. The DTH T2 gateway 3.8 uses a reference time clock, for example the PPS signal at 10 MHz coming from a satellite stream, but any other sufficiently precise shared clock may be suitable. The input parameters are the parameters for modulation of the T2-MI stream, these are typically the same parameters as those used in a conventional T2 gateway.

The first step 6.1 consists of generating the T2 frame clock or in other words obtaining the T2-MI stream in accordance with a second-generation standard comprising the programme multiplexer and at least synchronisation packets and signalling packets in accordance with the second-generation standard. This clock determines the duration of the T2 frame. At each stroke of this clock, the DTH T2 gateway inserts in the input stream the T2-MI DVB-T2 timestamp packets, step 6.2, and L1-current T2-MI, step 6.3. These packets are inserted or encapsulated advantageously in a private section (private data) in accordance with the ETSI standards 300 468 and 13 818-1. The private section is inserted in the original stream. Any other means for inserting the packets in the stream in a way that does not interfere with the decoding by a standard decoder can be used. The structure of the private section may, for example, be as follows: a field "Table_id" equal to 0x80, a field "private_section_length" equal to the total length of the T2-MI DVB-T2 timestamp packet including the correcting code and the header and a field "private_data_byte" containing the whole of the T2-MI DVB-T2 timestamp packet.

For the L1-current T2-MI packet, the private section contains for example the following fields: a field "Table_id" equal to 0x81, a field "private_section_length" equal to the total length of the L1-current T2-MI packet including the correcting code and the header and a field "private_data_a_byte" containing the whole of the L1-current T2-MI packet. It is this packet that contains the signalling on the programmes contained in the stream as well as the various PLP physical layer tunnels contained in the T2-MI stream.

During step 6.4, one or more packets containing all the PCR values of the packets of the original stream are inserted in the same way in the stream, or more precisely in private sections that are inserted in the original stream. Original stream means the multiplexed stream received at the input of the DTH T2 gateway. This is because, in order to remain in accordance with the ETR 290 standard, it is necessary to update the PCR values contained in the TS packets of the input or original stream in order to adapt them to the rate modification due to insertion of all these supplementary data in the original stream. When it is wished find this input stream again, these initial values of the PCRs can be restored by means of these packets containing them that are inserted in the private sections inserted in the original stream. For each T2-MI frame, all the PCR values of the packets of the frame are inserted, that is to say all the PCRs of the packets between two clock strokes of the T2 frame clock.

For the packet containing the PCRs, the private section contains for example the following fields: a field "Table_id" equal to 0x82, a field "private_section_length" equal to the total length of the field "private_data_byte" and a field "private_data_byte" that has the following structure:

```
Nb_services: 8 bits
For i from 1 to Nb_services
{
        Service_id: 16 bits
        Nb_PCR: 8 bits
        For j from 1 to Nb_PCR
        {
        reserved: 6 bits
        PCR: 42 bits
        }
}.
```

During step 6.5, advantageously, all the TS packets at the input of the DTH T2 gateway are time-stamped internally. This marking is based on the frequency of the modulator and is carried out by means of a 22-bit counter. This marking is identical to that done by a T2 gateway and corresponds to the ISCR (Input Stream Clock Reference) mechanism as defined in the ETSI standard 302 755 "Digital Video Broadcasting (DVB); Frame structure channel coding and modulation for a second generation digital terrestrial television broadcasting system (DVB-T2)". The last value preceding the insertion of an information packet for reconstructing the T2-MI stream is saved and transmitted in a TS packet. Likewise, it is possible to add in these packets information on the size of the memory required (BUFS) for decoding the stream received. Optionally, private information may be added. This private information may define the content of the TS streams in terms of programmes of the various tunnels.

During step 6.6, an updating of the PCRs of the TS packets is carried out. In order to generate a stream in accordance with the standard ETR 290, the PCRs of the various audio and video services are updated. This updating is intended to take into account the difference in rate between the derived stream and the original stream.

Optionally, a rate adaptation can be carried out during a step 6.7. This adaptation is then done by inserting stuffing sections. Normally, the stuffing sections are characterised by a PID programme identifier not referenced in an association table in accordance with the first-generation DVB standard. Here a different identifier is advantageously chosen. This makes it possible to distinguish between stuffing sections present in the original stream and those that are added optionally during this step. This is because, for the validity of the PCRs when the original stream is reconstructed, it is necessary to eliminate only the additional stuffing added during this step and not any stuffing present in the original stream.

In this way, a derived stream has been constructed from the original stream, augmented by private sections containing the information relating to this same stream such as would be encapsulated to the T2-MI format. The stream contains the same multiplexed programmes as the original stream and remains perfectly decodable by a conventional satellite decoder because of the updating of the PCRs.

FIG. 7 illustrates the method for generating the derived stream according to a second example embodiment of the present invention.

This method is implemented by the DTH T2 gateway 3.8. The DTH T2 gateway 3.8 receives an original MPTS stream coming from the multiplexer 3.2.

At step 7.1, the DTH T2 gateway 3.8 obtains a T2-MI stream according to a second-generation standard comprising the programme multiplex included in the original MPTS stream. The DTH T2 gateway 3.8 obtains a T2-MI stream according to a second-generation standard by generating, from the original stream, a T2-MI stream or receives a T2-MI stream comprising at least timestamp packets and L1 packets. The DTH T2 gateway 3.8 uses the timestamp packets and the L1 packets of the T2-MI stream received in order to generate the frame clock T2. The T2-MI stream is itself encapsulated in a new layer of the MPTS (Multiple Programme Transport Stream) type. The T2-MI stream comprises T2-MI data packets such as T2-MI timestamp synchronisation packets, signalling packets including the packet called L1-current that gives information on the structure of the T2-MI stream and packets called baseband frames containing the data of the MPEG-2 TS streams of the various tunnels. The T2-MI packets are organised in a T2-MI frame, each frame contains a T2-MI timestamp packet, a L1-current T2-I packet and baseband frame packets.

The DTH T2 gateway 3.8 generates a frame clock T2 from the T2-MI timestamp synchronisation packets. This clock determines the duration of the frame T2.

At the following step 7.2, the DTH T2 gateway 3.8 identifies, for each T2 frame, the packet of the original stream that corresponds to the start of a T2 frame and inserts, in place of a stuffing packet of the original stream, for example the first stuffing packet following the identified packet, a packet comprising information representative of a T2-MI DVB-T2 timestamp packet as well as information for determining the position of the identified packet in the stream. Each identified packet corresponds to the start of a T2 frame.

At the following step 7.3, the DTH T2 gateway 3.8 inserts, for each T2 clock stroke instead of a stuffing packet of the original stream, for example the second stuffing packet following the identified packet, a packet comprising information representative of the L1-current T2-MI packet.

It should be noted here that, in a variant, the information determining the position of the identified packet in the stream corresponding to a start of T2 frame can also be included in the packet comprising information representative of the L1-current T2-MI packet or be included only in the packet comprising information representative of the L1-current T2-MI packet or be included in another stuffing packet of the original stream.

The information representative of the T2-MI DVB-T2 timestamp packet and the L1-current T2-MI packet are inserted or encapsulated advantageously in a private section (private data) in accordance with the ETSI standards 300 468 and 13 818-1.

More particularly, the identifier of the stuffing packets is equal to 1FFF in hexadecimal, the frame identifier of the stuffing packets is replaced by a different programme identifier not referenced in a programme association table accessible to the decoder in accordance with the first-generation DVB standard.

The packets replacing the stuffing packets are parts of the original stream not decoded by the decoder according to the DVB standard.

At step 7.4, the DTH T2 gateway 3.8 time-stamps all the MPTS packets at the input of the DTH T2 gateway. This marking is based on the frequency of the modulator and is carried out using a 22-bit counter. This marking is identical to that done by a T2 gateway and corresponds to the ISCR (Input Stream Clock Reference) mechanism as defined in the ETSI standard 302 755 "Digital Video Broadcasting (DVB); Frame structure channel coding and modulation for a second generation digital terrestrial television broadcasting system (DVB-T2)". The last value preceding the insertion of an information packet for reconstructing the T2-MI stream is saved and transmitted in a TS packet. Likewise, it is possible to add in these packets information on the size of the memory required (BUFS) for decoding the stream received. Optionally, private information may be added. This private information may define the contents of the TS streams in terms of programmes of the various tunnels.

The information on the size of the memory required is for example inserted in stuffing packets the identifier of which is replaced by a different programme identifier not referenced in a programme association table accessible to the decoder in accordance with the first-generation DVB standard.

The DTH T2 gateway 3.8 has thus generated a derived stream.

A description will now be given of a first example of a method for reconstructing the T2-MI stream in a deterministic manner from this same derived stream by means of a DTH T2 generator. This method is illustrated by FIG. 8.

The DTH T2 generator is typically situated at the transmission site, that is to say at the foot of the DVB-T2 transmitter. It receives a TS stream, the stream derived from the original stream constructed by the DTH T2 gateway, and generates a standard T2-MI stream.

During a first step 8.1, it is necessary to extract from the stream the parameters of the T2-MI stream. These parameters are derived from the information relating to the T2-MI encapsulation inserted in the stream, typically it is the content of the DVB-T2 timestamp and L1-current and DVB-T2 packets. These packets are therefore extracted from the stream and analysed in order to obtain these parameters. Should the occasion arise the index of the superframe and the counter of the T2-MI packet are also recovered. The first ISCR counter is also saved. A superframe contains two T2-MI frames. The T2-MI timestamp package is identical for each frame included in the superframe.

During a second step 8.2, the original stream is reconstructed. To do this, the packets of the derived stream except for the private sections added are saved. This saving is done for a frame, that is to say for the packets between two sections containing the T2-MI timestamp and L1-current T2-MI packets. The original PCRs of the packets are restored from the saved values inserted in the derived stream in private sections. The stream thus stored is identical to the original stream.

During step 8.3, the value of the ISCR counter of each TS packet is calculated. For this purpose we use the values inserted in the stream when the derived stream is generated. In the derived stream we have one item of ISCR information per frame and it is therefore necessary to calculate an ISCR value for each packet by means of this frame value. For this purpose, two successive values of the ISCR counter are taken and the difference is taken, which is divided by integer division by the number of packets in the frame. This division gives us a quotient and a remainder. The value of the ISCR counter is then incremented by the quotient for each TS packet between the first and the remainder and by the quotient plus one for the other packets.

During step 8.4, one or more streams are reconstructed from the original stream. Next, it is necessary to construct the tunnels making up the stream to be generated. The programmes present in each of the tunnels to be generated are indicated in the private sections or defined by the user. Optionally, a single tunnel is generated. Even in this case, in general, this single tunnel comprises only a subset of the programmes contained in the original stream for reasons of maximum DVB-D2 rate compared with DVB-S. Exceptionally, a single tunnel can consist of all the programmes of the original stream. It is therefore a case of generating one or more streams each comprising a set of programmes issuing from the original stream and intended to be encapsulated in a physical-layer tunnel in the T2-MI stream generated. These streams are constructed by duplication of the original stream. Next, for each stream, the packets of the programmes not intended to be present in the tunnel, which are constructed from this stream, are nullified. Each stream created therefore contains only the packets relating to the programmes belonging to the tunnel and null packets. It will be understood that this ability to construct the tunnels from a choice of programmes in the original stream also makes it possible to implement a regionalisation using the invention. In this case, each region consisting of one or more SFN platforms will choose its own cluster within the original stream. The fact that the stream can then be different from one generation point to another does not nullify the SFN constraint since the same choice of programme is made within the same SFN area that belongs to a given region. The disparities then occur only from one SFN area to another.

During a step 8.5, the signalling tables of each of the streams are updated in order to reflect the elimination of a certain number of programmes in the stream. The tables that have to be updated are in particular the PATs (Programme Association Tables), SDTs (Service Description Tables) and NITs (Network Information Tables). In addition, the EIT (Event Information Table) packets describing a suppressed service are replaced by an EIT packet with a stuffing section in order to preserve the continuity counters for the purpose of preserving the SFN network. Thus the streams generated will have the same rate as the original stream and the same number of packets and the TS packets will have the same ISCR counter value. This step is optional, it is not necessary for example if the T2-MI stream contains a single tunnel containing all the original programmes.

During a step 8.6, the T2-MI stream is constructed from the restored stream and information relating to the T2-MI encapsulation extracted. The TS streams are encapsulated in T2-MI packets. By means of the L1-current T2-MI packet, the number of tunnels as well as their modulation parameters are known. The size and number of baseband frames for each of the tunnels in a T2 frame are derived therefrom. The baseband frames are constructed in HEM (High Efficiency Mode) with the activation of the suppression of null packets. For each of the tunnels to be processed, the baseband frames are filled as long as there are packets available and the remaining frames are filled with stuffing. The baseband frames are next encapsulated in T2-MI packets. The T2-MI packet counter and the T2 superframe index are derived from the previous L1-current T2-MI packet. Likewise, the ISCR field of the header of the baseband frame is updated.

During a step 8.7, the last T2-MI DVB-T2 timestamp and L1-current packets are then inserted one after the other.

During a last step 8.8, the T2-MI stream thus generated is encapsulated, if necessary, in an MPTS stream in accordance with the DVB-TS standard.

Figure 9:
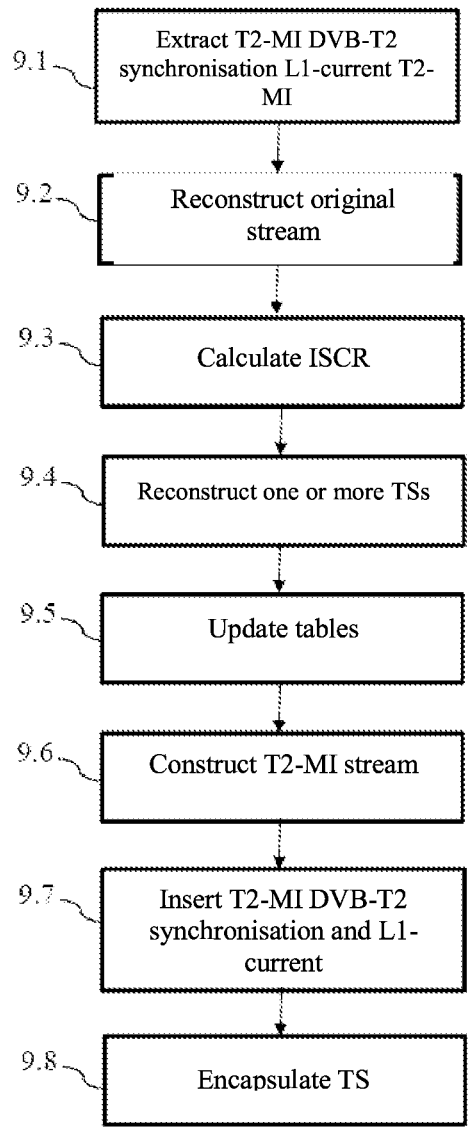
FIG. 9 illustrates the method for generating a stream according to a second-generation DVB standard from the derived stream according to the second example embodiment of the present invention.

FIG. 9 illustrates the method for generating a stream in accordance with a second-generation DVB standard from the derived stream according to the second example embodiment of the present invention.

At step 9.1, the DTH-T2 generator 3.9 extracts, from the stream received from the satellite 3.4, the T2-MI DVB-T2 timestamp synchronisation packets and L1-current packets inserted in packets having a programme identifier not referenced in a programme association table accessible to a decoder in accordance with the first-generation DVB standard and extracts the information identifying each packet corresponding to a start of T2 frame and derives therefrom modulation parameters and PLP physical layer tunnels. At this same step, the DTH T2 generator 3.9 stores the index of the superframe and the T2-MI packet counter, as well as the value of the first ISCR counter of the first packet of the T2 frame. A superframe contains at least two T2 frames. The T2-MI timestamp packet is identical for each T2 frame included in the superframe.

At step 9.2, the DTH T2 generator 3.9 reconstructs the original stream. To do this, the DTH T2 generator 3.9 stores the packets of the derived stream with the exception of the packets having a programme identifier not referenced in a programme association table accessible to a decoder in accordance with the first-generation DVB standard, replaces the programme identifiers not referenced in a programme association table accessible to a decoder in accordance with the first-generation DVB standard with the identifier corresponding to a stuffing packet and stores the stuffing packets thus re-established.

At step 9.3, the DTH T2 generator 3.9 calculates the value of the ISCR counter of each TS packet. The DTH T2 generator 3.9 uses the values inserted in the stream when the derived stream was generated. The derived stream comprises one ISCR value per frame, the DTH T2 generator 3.9 calculates an ISCR value for each packet by means of the ISCR value of the frame. The DTH T2 generator 3.9 takes two successive values of the ISCR counter, takes the difference thereof, and divides it by the number n of packets in the frame. This division gives a quotient ISCR_offset and a remainder ISCR_rest.

The value of the ISCR of a packet is calculated as follows:

For a packet n lying between 1 and N-ISCR_rest, where 1 is the packet identified as the T2-MI frame start:

$ISCR(n) = ISCR(n-1) + ISCR\_offset$

For a packet n lying between (N-ISCR_rest+1 and N $ISCR(n) = ISCR(n-1) + ISCR\_offset + 1$.

At step 9.4, the DTH T2 generator 3.9 reconstructs one or more streams from the original stream as well as the tunnels making up the stream in accordance with the second-generation DVB standard. The programmes present in each of the tunnels to be generated are indicated in the private sections or defined by the user. Optionally, only one tunnel is generated. This single tunnel comprises a subset of the programmes contained in the original stream or all the programmes of the original stream. The DTH T2 generator 3.9 generates one or more streams each comprising a set of programmes issuing from the original stream and intended to be encapsulated in a physical-layer tunnel in the T2-MI stream generated. These streams are constructed by duplication of the original stream.

Next, for each stream, the DTH T2 generator 3.9 nullifies the packets of the programmes not intended to be present in the tunnel reconstructed from the original stream. Each stream created contains only the packets relating to the programmes belonging to the tunnel and null packets. It will be understood that, because of the ability to construct the tunnels from a choice of programmes in the original stream, the present invention also makes it possible to implement regionalisation using the invention, that is to say local programmes in at least one tunnel. A local programme is a programme not included in the original stream. The fact that the stream generated can then be different from one generation point to another does not violate the SFN constraint since the same choice of programme is made within the same SFN platform that belongs to a given region.

At step 9.5, the DTH T2 generator 3.9 updates the signalling tables of each of the streams in order to reflect the suppression of a certain number of programmes in the stream. The tables that are to be updated are in particular the PAT (Programme Association Table), SDT (Service Description Table) and NIT (Network Information Table) programme association tables. In addition, the EIT (Event Information Table) packets describing a suppressed service are replaced by an EIT packet with a stuffing section in order to preserve continuity of the counters. Thus the streams generated will have the same rate as the original stream and the same number of packets and the MPTS packets will have the same ISCR counter value. It should be noted here that this step is optional, it is not necessary for example if the T2-MI stream contains a single tunnel containing all the original programmes.

At step 9.6, the DTH T2 generator 3.9 constructs the T2-MI stream from the reconstructed stream, information representative of T2-MI DVB-T2 timestamp synchronisation packets and L1-current packets included in the packets having a programme identifier not referenced in a programme association table accessible to a decoder in accordance with the first-generation DVB standard.

The MPTS streams are encapsulated in T2-MI packets. Using the L1-current T2-MI packet, the number of tunnels as well as the modulation parameters thereof are known. The size and number of baseband frames for each of the tunnels in a T2 frame are derived from the L1-current T2-MI packet. The baseband frames are constructed in HEM (High Efficiency Mode) with activation of the suppression of the null packets. For each of the tunnels to be generated, the baseband frames are filled as long as there are packets available and the remaining frames are filled by stuffing. The baseband frames are next encapsulated in T2-MI packets. The T2-MI packet counter and the T2 superframe index are derived from the previous L1-current T2-MI packet. Likewise, the ISCR field of the header of the baseband frame is updated.

At step 9.6, the DTH T2 generator 3.9 and the last T2-MI DVB-T2 timestamp and L1-current packets are then inserted one after the other.

At step 9.6, the DTH T2 generator 3.9 and the T2-MI stream thus generated are encapsulated, if necessary, in an MPTS stream in accordance with the DVB-T2 standard.

It should be noted that this method for generating the T2-MI stream from the derived stream is deterministic and can therefore be reproduced at each transmitter in an SFN broadcasting zone without compromising the synchronisation constraints of the SFN broadcasting. By virtue of the invention, it is possible to broadcast only a single stream that can be decoded directly by first-generation decoders at the user and serve for a DVB-D2 broadcasting even in SFN mode. This single broadcasting of a single stream is particularly advantageous in the case of satellite broadcasting, a broadcasting mode where bandwidth is expensive.

The invention claimed is:

1. A method for generating a stream referred to as a derived stream, from a stream referred to as an original stream, said original stream being a transport stream comprising a program multiplex in accordance with a first-generation of the Digital Video Broadcast standard decodable by a decoder according to the Digital Video Broadcast standard, wherein the method is executed by a gateway for generating the derived stream, wherein the transport stream is received by the gateway for presentation and comprises:
obtaining by the gateway a modulator interface stream according to a second-generation of the Digital Video Broadcast standard comprising the program multiplex and at least synchronisation packets and signalling packets in accordance with the second-generation of the Digital Video Broadcast standard,
generating by the gateway the derived stream by inserting in the original stream the synchronization packets and the signalling packets, the synchronization packets and the signalling packets being inserted in packets having a program identifier not referenced in a program association table accessible to the decoder according to the first-generation of the Digital Video Broadcast standard and in that the packets having a non-referenced program identifier replace stuffing packets included in the original stream; and
transmitting the derived stream for reception by a decoder according to the first-generation of the Digital Video Broadcast standard and subsequent presentation of a decoded program on a user terminal.

2. The method according to claim 1, wherein at least one packet having a non-referenced program identifier further comprises information identifying the position of a packet of the original stream included in the derived stream.

3. The method according to claim 2, wherein the program identifier not referenced in the program association table accessible to the decoder in accordance with the first-generation of the Digital Video Broadcast standard is different from a program identifier which identifies null program packets.

4. A method for generating a stream according to a second-generation of the Digital Video Broadcast standard from a so-called derived stream, comprising a program multiplex according to a first-generation of the Digital Video Broadcast standard decodable by a decoder according to the Digital Video Broadcast standard and at least synchronisation packets and signalling packets according to the second-generation of the Digital Video Broadcast standard, wherein the method is executed by a generator for generating the stream according to the second-generation of the Digital Video Broadcast standard from the so-called derived stream and comprises:
extracting by the generator at least synchronisation packets and signalling packets according to the second-generation of the Digital Video Broadcast standard included in the derived stream in packets having a program identifier not referenced in a program association table accessible to the decoder according to the first-generation of the Digital Video Broadcast standard and in that the packets having a non-referenced program identifier replace stuffing packets included in the original stream,
generating by the generator the stream according to the second-generation of the Digital Video Broadcast standard from the derived stream and the extracted synchronisation packets and signalling packets according to the second-generation of the Digital Video Broadcast standard, wherein the generated stream is received by the generator for presentation; and
transmitting the stream according to the second generation of the Digital Video Broadcasting standard to a modulator for further broadcasting of the stream to the decoder according to the second generation of the Digital Video Broadcast standard.

5. The method according to claim 4, wherein each packet having a non-referenced program identifier further comprises information identifying the position of a packet included in the derived stream.

6. A gateway for generating a stream referred to as the derived stream, from a stream referred to as an original stream, said original stream being a transport stream comprising a program multiplex in accordance with a first-generation of the Digital Video Broadcast standard decodable by a decoder according to the Digital Video Broadcast standard, wherein the transport stream is received by the gateway for presentation, wherein the gateway comprises circuitry causing the device to perform:
obtaining by the gateway a modulator interface stream in accordance with a second-generation of the Digital Video Broadcast standard comprising the program multiplex and at least synchronisation packets and signalling packets in accordance with the second-generation of the Digital Video Broadcast standard, and
generating by the gateway the derived stream by inserting in the original stream the synchronisation packets and the signalling packets, the synchronisation packets and the signalling packets being inserted in packets having a program identifier not referenced in a program association table accessible to the decoder according to the first-generation of the Digital Video Broadcast standard and in that the packets having a non-referenced program identifier replace stuffing packets included in the original stream.

7. A generator for generating a stream according to a second-generation of the Digital Video Broadcast standard from a so-called derived stream, comprising a program multiplex according to a first-generation of the Digital Video Broadcast standard decodable by a decoder according to the Digital Video Broadcast standard and at least synchronisation packets and signalling packets according to the second-generation of the Digital Video Broadcast standard, wherein the generator comprises circuitry causing the device to perform:
extracting by the generator at least synchronisation packets and signalling packets according to the second-generation of the Digital Video Broadcast standard included in the derived stream in packets having a program identifier not referenced in a program association table accessible to the decoder according to the first-generation of the Digital Video Broadcast standard and in that the packets having a non-referenced program identifier replace stuffing packets included in the original stream, and
generating by the generator the stream according to the second-generation of the Digital Video Broadcast standard from the derived stream the marker values of which were updated, and the extracted synchronisation packets and signalling packets according to the second-generation of the Digital Video Broadcast standard, wherein the generated stream is received by the generator for presentation.

* * * * *